July 29, 1941.  J. F. HABERLIN  2,250,762
CHEMICAL DISCHARGING MEANS FOR AIRCRAFT
Filed Sept. 30, 1938   3 Sheets-Sheet 1

Inventor
John F. Haberlin
By Charles L. Reynolds
Attorney

July 29, 1941.                J. F. HABERLIN                2,250,762
              CHEMICAL DISCHARGING MEANS FOR AIRCRAFT
                 Filed Sept. 30, 1938          3 Sheets-Sheet 3

Inventor
John F. Haberlin
By Charles L. Reynolds
Attorney

Patented July 29, 1941

2,250,762

UNITED STATES PATENT OFFICE 2,250,762

CHEMICAL DISCHARGING MEANS FOR AIRCRAFT

John F. Haberlin, Seattle, Wash., assignor, by mesne assignments, to Boeing Airplane Company, Seattle, Wash., a corporation of Delaware Application September 30, 1938, Serial No. 232,691

26 Claims. (Cl. 244—136)

It is occasionally desirable to discharge chemical agents from aircraft. One of the most common commercial uses for such an arrangement is in dusting crops or forests for the control of parasites or pests. The discharge of chemicals, however, has also military uses. As an example, a low-flying airplane may discharge smoke-producing chemicals, thereby laying down a smoke screen.

Where such a smoke screen is only thrown as a general curtain between friendly and enemy forces, both (or the enemy, at least) at a distance, as for instance between two naval fleets, speed of the airplane and lessening of its drag, while yet desirable, are not imperative, as the airplane need not approach so closely to an enemy that a difference in speed of a few miles an hour will materially increase his risk. If, however, such chemicals are to be discharged in close proximity to enemy forces it is of the utmost importance, both to the completion of the mission and to the safety of the aircraft and its pilot or crew, that the airplane be impeded to the least possible degree, in order that it may attain maximum speed, and so that it may have maximum maneuverability.

For such reasons it is of extreme importance that all drag-producing parts or accessories be eliminated to the greatest degree possible, in airplanes which are to discharge military chemicals, and even in commercial operations the lessening of drag increase the performance and economy of the airplane.

Certain chemicals which may be thus discharged are corrosive or otherwise extremely destructive or disabling upon contact. In addition, upon volatilization or inhalation they produce markedly adverse physiological effects. For such reasons they must be kept from contact with or proximity to the pilot or crew of the airplane which transports them, and from the ground crew. There is an interchange of pressure between the upper and lower surfaces of an airfoil, such as an airplane wing, in flight, principally about the trailing edge, and this may disturb the discharge of chemicals and cause them to be drawn towards the pilot or towards or into the interior of the aircraft construction, where in time, and in proper concentrations, they deleteriously affect the pilot and crew, and, upon landing, the ground crew. Therefore not only must they be so carried that they will not produce drag, which would indicate that they should be carried upon or within the fuselage, but they must be so discharged that by no possibility can they reenter the aircraft structure, which in turn precludes their being carried within the fuselage. For protection of the ground crew, should an airplane return to its base without having discharged its chemicals, it is necessary that the chemical container be droppable in flight, without undue disturbance of the stability of the aircraft, for it is better to lose the chemical and its container than to risk injury to the crew.

If the chemical is a liquid of a type which will be most effective when dispersed most finely, such dispersion may be facilitated by effecting the discharge within the slip stream of a propeller, for such a concentrated air blast will break up drops or globules of most liquids into a fine mist. On the other hand, if it be desired to discharge a liquid as drops, its discharge should be outside of the slip stream. In the latter case discharge adjacent the fuselage, in a single-engine airplane, would be futile, and even in a twin-engine airplane the fuselage is affected by the slip stream, and as well, by eddy currents, so that discharge inside of the slip stream is inadvisable.

It is further extremely desirable, if not absolutely essential, that the chemical containers, after discharge, be thoroughly evacuated, and while provisions have been made heretofore for evacuating such chemical containers by an air stream or blast through them, it has been found that this is not in all cases sufficient.

Moreover, since a modern airplane, and especially one which would discharge chemicals in the proximity of enemy troops, flies at maximum speed, and since every effort is employed to obtain very high speeds in aircraft designed for such missions, the airplane will travel a very considerable distance in a few seconds, and provision must be made to insure positive discharge and substantially complete evacuation of the contents of the chemical container, perhaps several gallons in a relatively short time period, a few seconds, yet through a sufficiently small orifice or nozzle to obtain the desired degree of dispersion and atomization.

The shipping and handling of chemical containers of this nature, and the act of mounting them upon and connecting them to the aircraft and discharge means, offer also problems of considerable magnitude. Such containers must be handled with extreme care, and even so, since they must be made ready for instant discharge under control of the pilot, and therefore are opened when ready to connect to the discharge means, it is the rule rather than the exception that ground crews will be unable to handle more than a few such containers, and to apply them to aircraft, ready for discharge, until they have been so seriously affected by the chemical that they are unable to proceed further. Such containers must be protected against damage in shipment and handling, and must be so constructed and arranged that there is no possibility of leakage or discharge of chemical during the operation of mounting them upon the aircraft and connecting them to discharge mechanism.

Having the above problems in mind, and others as will appear hereafter, it is the object of the present invention to provide chemical discharge means for use upon aircraft which will, in the largest measure possible, meet and solve these various problems.

In the solution of these problems it has been found desirable to mount the chemical container or containers at or adjacent the wing tips of an airfoil, such as an airplane wing, and a further object is therefore so to construct the airplane wing that it will itself receive the chemical, to seal it off from the remainder of the structure, and to form the structure in such a way that notwithstanding its reception of the chemical, and the necessity of supporting its weight at such a distance from the fuselage, the structure will nevertheless be adequately strong, and if the structure is formed as a closed flotation cell, to preserve its capability to this end to the largest degree feasible.

With these and other objects in mind, as will appear hereafter, my invention comprises the novel parts and the novel combination and arrangement thereof, with respect to each other and with respect to the aircraft structure, as is shown in the accompanying drawings, described in this specification, and as will be more particularly pointed out by the claims which terminate the same.

In the accompanying drawings I have shown my invention embodied in various illustrative forms, as now preferred by me.

Figure 1:
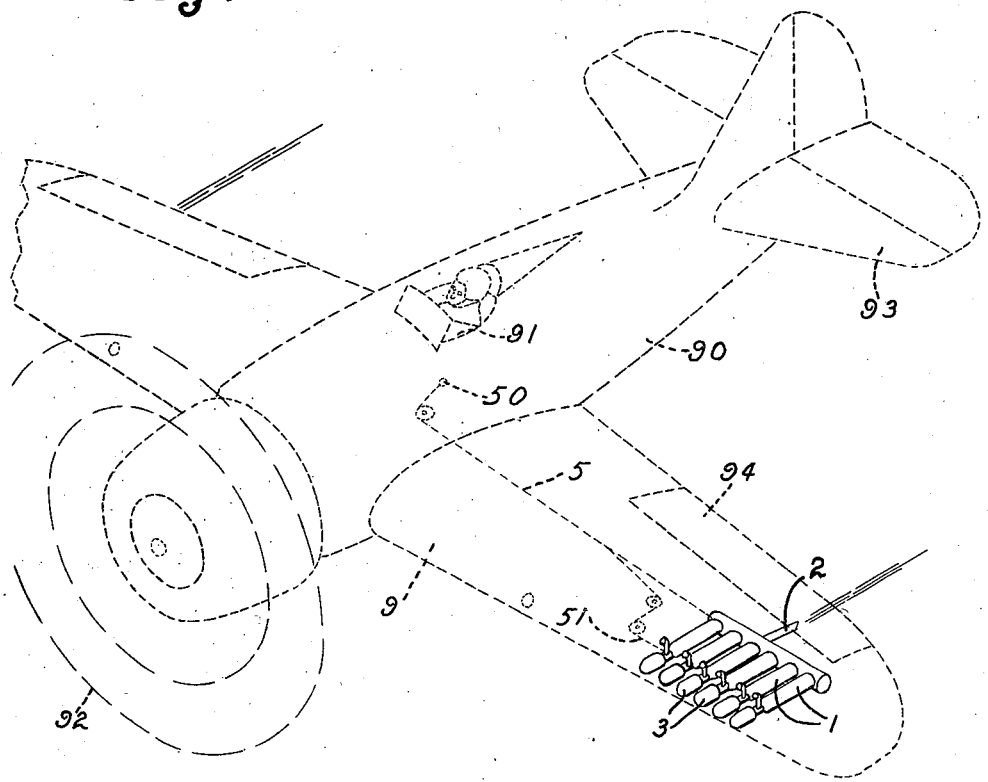
Figure 1 is a perspective view of an airplane in flight, showing my invention incorporated therein, the aircraft, however, being shown in dash lines and its structural details being omitted.

Prior installations have been generally of the nature of a large elongated tank, substantially circular in cross section, perhaps 30 inches in diameter, and with rounded ends, or even of somewhat streamline form, which is suspended beneath and wholly outside of the fuselage or the wing, but when on the wing located close to the fuselage, and which is provided with a generally rearwardly directed discharge nozzle, with means operated by the pilot to control the discharge, and with an air scoop that might be placed in communication with the interior of the tank, at or subsequent to discharge, which by the movement of trapped air in flight would serve to direct air through the discharging and discharged container. Such a container is conveniently supported from the bomb shackles of a military airplane. There were, however, numerous objections to such an installation. An airplane taking off from an improvised field might have the container in taxying caught on brush, or in landing the empty depending container might catch on brush, or in a deck landing might foul the cross cables. In any such case the likelihood of damage is great, and further harmful effects would follow any rupture or disturbance of a filled container. In order to obtain a capacity which was sufficient to be useful for its intended purpose, the container had to be large, and was therefore unwieldy, and the more likely to foul obstructions. Since it had to be as light as possible it tended to be somewhat fragile. While it might be kept closed by removable closures during shipment, it was necessary to remove these closures at the time of connecting it to discharge mechanism. By reason of such considerations it produced an extremely harmful effect upon the ground crews handling it and had to be handled with extreme care to prevent leakage during transit.

Moreover, once in place upon the airplane, because of the normal location of bomb shackles, and because the tank was a concentrated drag-producing, weighty mass, which would unduly stress the wing structure if left exposed, it was necessarily carried close to the fuselage, and close to the under surface of the wing or fuselage. This meant, in most cases, that it was well within the slip stream from the propeller or propellers, and the slip stream, upon discharge of the liquid chemical, tended to disintegrate the drops into a mist, which, in some cases, largely destroyed the value of the liquid for its intended purpose. Moreover, such a mist, with droplets of no appreciable mass, were easily and frequently caught in eddy currents and in the interchange of pressure from bottom to top and past the trailing edge of the wing. Due to such factors it was practically impossible to prevent deposit of the chemical upon exterior surfaces of the airplane, which meant that they must be thoroughly cleansed upon the completion of each flight, both to avoid excessive harm to personnel and to prevent corrosion of matériel, and also it tended to enter, either in liquid or in vapor form, into the interior of the aircraft structure, and even before the completion of the flight during which the chemical was discharged it was not infrequent to have the chemical so seriously affect the pilot or crew that intense nausea or illness resulted, sometimes to the point of endangering the safety of the airplane and its pilot or crew.

Suspended thus below the airplane, and being of large bulk, such a container, with its necessary supporting shackles and sway braces, created a very appreciable drag in flight, two or more such containers reducing the speed of the airplane by many miles an hour. This not only cut down the airplane's speed, but reduced its range, economy, and effectiveness.

Briefly, the above difficulties are avoided, in the present invention, by containing the chemical, not in one large container the form whereof bears no relation to the aircraft structure nor to the conditions under which it is to be used, but in a container which is so formed that it becomes an integral part of the streamlined aircraft structure; the aircraft structure being in effect interrupted or incomplete if or when the container is missing, and completed and restored by the presence or placement of the container. The container may be shaped, for instance, as the wing tip panel, the wing being formed without wing tips, or with normal wing tips that are replaceable by the containers, of the same shape. The container may as a whole constitute a chemical tank, or may, preferably, constitute a support for one or several smaller removable and replaceable containers, each of which may be elongated and of slight diameter, thereby being shaped more suitably for shipping and handling. The difficulties noted above (for instance, the undesirably fine atomization of the discharge) are further avoided by mounting the containers at or adjacent the tip of the airplane's wing, thereby removing them from the influence of the propeller's slip stream, and increasing safety of handling and use by removing them from any proximity to the pilot or fuselage. At the same time, by almost wholly eliminating any excess drag, indeed, making them part of the lift-producing surfaces, and by avoiding localization of points of their support (such as the bomb shackles heretofore used), the wing is enabled to support them thus far removed from the fuselage with little if any added strengthening.

The effectiveness and completeness of their discharge within a given time period, and the production of a discharge sufficiently sustained as to time and amount, is further advanced by the provisions of this invention. Positive evacuation is achieved by providing each separate container with a $CO_2$ bottle of proper pressure and capacity to forcibly discharge and purge the container within the desired time. Sufficiently sustained discharge is produced by deferred sequential discharge of the several individual containers, in properly timed sequence. Discharge is assisted, and proper or desired dispersion and drop size is achieved, by effecting discharge through a nozzle which is positioned adjacent the trailing edge of the wing tip, but well below the wing, so that it is out of the influence of the pressure interchange between the wing surfaces, but shaped and directed to assist eduction by the relative airstream. Purging may be further insured by providing air scoops which, during or after discharge of the contents, will effect a strong movement of air through the containers and out at the nozzle. Drag, already far less than in prior installations, may be lessened by making projecting parts—the nozzle, for instance—retractable.

By using small individual containers each will be stronger and more easily handled, and if one is damaged or spilled the danger is less than if it were one large container; they will fit within recesses substantially wholly within the aerodynamic contour of the wing or other aircraft structure, and drag is thereby eliminated, as also the danger of fouling. The $CO_2$ bottles may be connected thereto after they have been installed, and these $CO_2$ containers may likewise be supported substantially wholly within the aerodynamic contour of the structure. There may be provided or applied to the chemical containers closures which need not be removed in the course of installation, and which remain intact until such time as the pilot operates controls provided for the discharge of the chemical. Furthermore, thus supported, the entire installation, or indeed, if desired or necessary, the entire wing tip, may be dropped just prior to returning to a landing field without having had an opportunity to discharge the chemical, yet even without such a wing tip the airplane can be landed with the reasonable expectation of preserving it intact, and having landed it will be ready for use with the installation of a new wing tip.

In order that the principles of my invention may be fully understood I shall proceed to a detailed description of the several forms shown in the accompanying drawings, it being understood, however, that these forms are illustrative of the principles only, and are not intended to be restrictive.

The airplane shown in Figure 1 is largely conventional in character, and the particular manner in which the airplane is constructed or arranged, other than as indicated, constitutes no part of my invention. It comprises the wing 9, whereon is mounted a fuselage 90 enclosing the cockpit 91, and carrying an engine at its nose which rotates a propeller about the circle 92. Tail surfaces 93 and ailerons 94 constitute the maneuvering controls for the airplane. It will be understood that spanwise spars or their equivalent, as shown for instance at 95, and ribs transverse thereto, as indicated at 96, or equivalents thereof, constitute the structural skeleton or framework of the wing over and about which a skin is supported to constitute the wing. These elements, and particularly in airplanes intended to fly over water, are frequently sealed to constitute flotation elements, should the airplane, being a land-type plane, be forced to descend upon water. One of the objects of the invention is to preserve to the fullest degree possible this ability of the wing to float while yet adapting it to the support and practical operation of the chemical discharging mechanism.

The preferred form and arrangement of the chemical discharge mechanism is shown in Figures 1 to 5 inclusive. In this form the wing structure is recessed, preferably by forming a tunnel or a series of tunnels 97 through the wing, sealed off from the flotation cell, extending longitudinally of the airplane, adjacent the wing tip and well outside the slip stream of the propeller, the limitations of which are roughly defined by the circle 92. It should be noted that these tunnels 97 open in the leading edge of the wing and extend generally slantingly downward and rearward to emerge in the under surface of the wing, where they may be closed by a removable panel 98. One reason for thus inclining the tunnels is to make every part of the chemical discharge mechanism drain by gravity to a discharge point. The panel 98 is normally closed to maintain the airfoil contour of the wing, but may be removed or dropped by mechanism under the control of the pilot, when it is desired to drop the entire chemical discharge mechanism; such panel-releasing mechanism being common in the art, it is not illustrated in detail.

Within each such tunnel 97, the continuity of which insures the flotation characteristics of the wing through which it passes, is received a chemical container or cartridge 1. This is formed of suitable material, and preferably is generally circular in cross section and considerably elongated. Its form and proportions may be varied as required to fit particular wings. It is of such length and diameter, however, that it may be substantially entirely received within the aerodynamic contour of the particular aircraft structure which contains it, and in the latter respect, while it is preferably carried at or near the wing tip, it is still within the spirit of my invention, other considerations being kept in mind, that the chemical container may be mounted elsewhere than at or within the tip of the wing.

Each of these cartridges 1 constitutes a shipping container, which by reason of its relatively small size and capacity may be made considerably stronger than a single large container, and preferably several such cartridges are employed in a given installation. Each of these containers 1 may be threaded or otherwise removably secured within sockets 20 formed on a header 21, the latter extending spanwise within the wing, and sloping somewhat downwardly and inwardly, and at the low point of the header is connected a discharge nozzle 2. While the use of individual cartridges is preferred, as described, in the aggregate the wing tip constitutes the container as a whole.

Discharge of chemical from the container 1 is normally prevented in shipment by a removable cap (not shown), which threads onto that end which is received within the socket 20. The loss of contents is also prevented by a rupturable diaphragm 10, likewise closing this end of the container, and thus it is possible to remove the shipping cap and yet to prevent any loss of contents or any contact of its contents with the hands or clothing of the ground crew, by reason of the fact that it still remains closed by the diaphragm 10. This diaphragm may be further supported, prior to actual discharge, by a valve or gate 22 pivotally mounted at each socket 20, provided with an arm 23 and a spring 24 acting thereon to open the gate 22, the movement of the gate being restrained, however, by a pull-out pin 25, which is removed only under control of the pilot while in flight.

Figure 3:
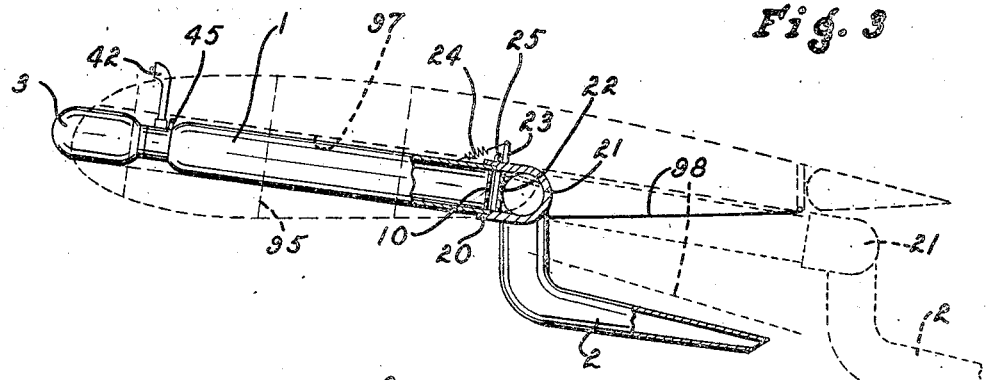
Figure 3 is a similar view in side elevation.
Figure 5:
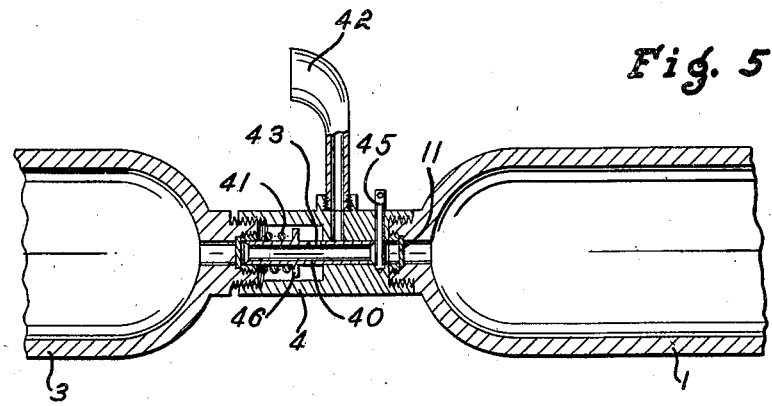
Figure 5 is an enlarged axial section, showing a typical device for controlling the release of gas under pressure for the positive discharge of chemical and the evacuation of its container.

Ordinarily the device will not be so arranged that discharge of the chemical from the container 1 will occur merely by swinging aside the gate 22 to the dash line position of Figure 3, but additional and positive means are provided to insure discharge and evacuation of the contents of the container 1. To this end I provide conveniently a container 3, which is filled with a fluid medium under considerable pressure. For instance, the container 3 may be a $CO_2$ bottle filled with liquid carbon dioxide. The gas-filled container 3 is preferably entirely separable from the chemical container 1, but is securable upon the end of the latter opposite the nozzle 2, after the chemical container has been put in place. The $CO_2$ bottle 3, as is common with such devices, may be maintained closed by a rupturable diaphragm 39, and the adjoining end of the container 1 may likewise be maintained closed by a rupturable diaphragm, as indicated in Figure 5 at 11. Means may be provided for rupturing the diaphragm 39 of the container 3 by the action of placing it in operative relationship to the chemical container 1 (thus, the diaphragm 39 will be ruptured by the sharp adjacent edge of a sleeve 40, by further screwing the container 3 home), and means may be provided interposed between the two containers so that the carbon dioxide may be released and discharged into and through the chemical container at such time as it is desired to discharge the latter, the pressure thus developed within the chemical container rupturing also the diaphragm 10 upon coincident withdrawal of the gate 22. It will be noted that the gas-filled container 3 is received substantially entirely within the aerodynamic contour of the wing, although for convenience of engaging it it may project slightly in advance of the leading edge of the wing, quite insufficient, however, to produce any marked drag, and in any event in the general plane of the wing chord.

The mechanism to control discharge of the chemical container, or of the gas-filled container, or both, is largely immaterial. Any mechanism found suitable may be employed. However, in Figure 5 there is shown a type of mechanism which may be employed to control communication between the gas-filled container and the chemical container, and for insuring evacuation of the latter after the discharge has been completed. Thus, interposed between the two containers is a fitting 4, within a portion of which is closely received a slidable sleeve 40, previously mentioned, one end of which is positioned and adapted to puncture the diaphragm 11, and the other end of which, by the action of screwing home the container 3, has by now already ruptured the diaphragm 39. A spring 41 serves to project the sleeve 40 towards the diaphragm 11 and supplies the force for puncturing the latter. This puncturing action is normally prevented, however, by a stop pin 45, which can only be withdrawn under the control of the pilot. Furthermore, to insure completion of the evacuation, and to direct a draft of air through the chemical container, even after its discharge, and thereby to insure to the fullest degree possible that the last vestige of the chemical has been purged from the chemical container, I provide an air scoop 42 removably secured upon the fitting 4 and adapted to communicate with an aperture 43 in the sleeve 40 when the latter is in its final position, which position is fixed by the stop shoulder 46 after withdrawal of the pin 45. The air scoop 42 in operative position projects somewhat into the air stream above or below the wing.

Figure 4:
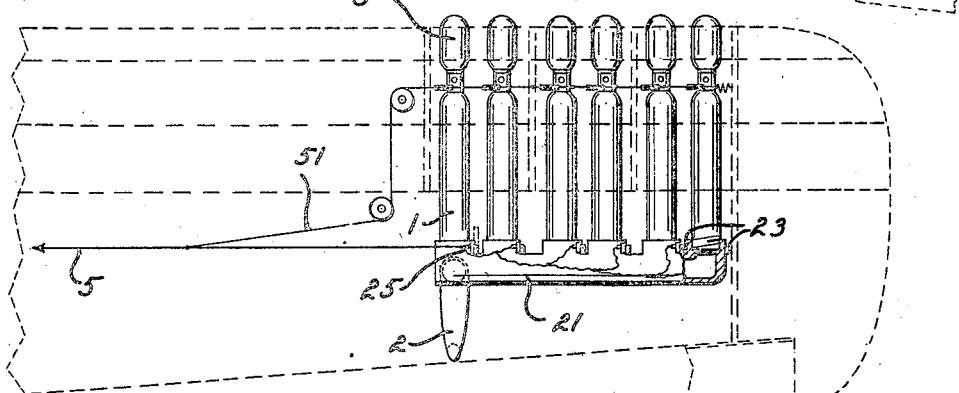
Figure 4 is a plan view, all showing a preferred form of installation.

It is preferred that each individual chemical container or cartridge 1 be independently and separably mounted, that each such container be provided with its own gas-filled container 3 and with its own air scoop 42. Preferably, however, the means to discharge all such containers are common, but so arranged as to insure a train or sequential discharge, preferably somewhat overlapped, so that there is in effect a continuous discharge at the nozzle 2. Such release mechanism as shown in Figure 4, by way of example, may consist of a cable 5, provided adjacent the cockpit 91 with a ring 50, the cable being guided by suitable pulleys and extending from the cockpit to the pin 25 of the first of the chemical containers to be discharged. A branch cable 51 connected to the cable 5 also extends over suitable pulleys and is connected to the pin 45 of the same container. Each of these cables 5 and 51 extends on in turn, but with lost motion, to the stop pins 25 and 45, respectively, of the successive containers, in such manner that when the pilot pulls on the ring 50 the first chemical container 1 and its gas-filled container 3 are substantially simultaneously released for discharge through the nozzle 2, and continued pull upon the ring 50 results in the closely subsequent discharge of the next container, and so on, until all have been discharged. The interval between them is relatively short, perhaps one second. If the airplane is traveling at a speed of 180 miles per hour, in the six seconds, approximately, that it takes to discharge six such containers, at intervals of one second apart, the airplane will have traveled three-tenths of a mile, or 1584 feet. Should the airplane travel at the rate of 300 miles per hour, in six seconds it will travel exactly one-half mile. It will be seen, then, that the discharge must be prompt, positive, and substantially complete, that discharge of the individual containers must follow with certainty and rapidity, and if the release of a second container occurs somewhat prior to the complete evacuation of a preceding container the only result will be to insure substantially continuous and uniform discharge instead of an intermittent discharge. The actual discharge-controlling mechanism may be manual or automatic, since its form and arrangement are not here material.

The nozzle 2, it will be noted, is directed downwardly to a point appreciably below the lower wing surface, and it is directed rearwardly. It projects into the relative air stream, but not into the slip stream, however. Its outlet shape assists eduction. It is so located, or sufficiently spaced from the wing's skin, that the discharging chemical is not unduly nor appreciably affected by the interchange of pressure over the trailing edge of the plane, and hence does not deposit upon the airplane's surfaces. Being discharged outside the slip stream, the chemical, if a liquid, may be discharged in drops of appreciable size which fall as drops, once they are released into the air stream.

Figure 2:
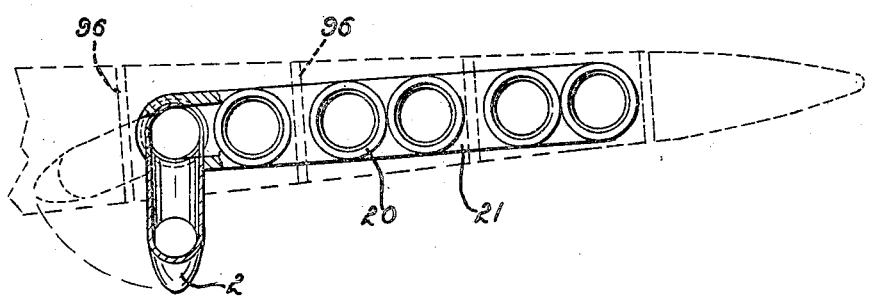
Figure 2 is a front elevation of a part of the chemical discharge mechanism, with parts in section, and illustrating the relationship of such mechanism to the aircraft structure.

In order to lessen the drag the nozzle 2 at its upper end may be rotatably mounted upon the header, as indicated in Figure 2, so that it may swing transversely of the airplane from its projected or operative position into a retracted position within a recess provided in the wing, as shown in dash lines in Figure 2. In the latter position it is removed outside the air stream and lies substantially wholly within the aerodynamic contour of the wing. The mechanism for accomplishing this retraction has not been shown, but any convenient mechanism, such as is known to the art, may be employed to this end.

In the form described, if it is necessary to return to a base without having had opportunity to discharge the chemicals, and if there is danger of accidental discharge while landing, the pilot may release the panel 98 which maintains the entire assembly in operative position. Again means for accomplishing this may be any that are suitable. When the panel 98 has been released the entire assembly may slip through and be released, the air scoops 42 or other elements which might tend to hinder this movement being of such construction or so connected that they will be broken or released by the weight and tendency to movement of the entire assembly. The entire assembly then drops from the airplane, and the airplane can be landed with only the loss of the discharging equipment. Alternatively, and as explained below, the entire wing tip panel, carrying the containers 1 and the connected devices, may be dropped as a unit.

I have described a particular form of discharging and discharge-controlling mechanism, and a form which at present appears preferable. It is not outside my invention, however, to accomplish or to control or initiate discharge by other means, and such other means might readily be mechanical or electrical in nature.

Figure 6:
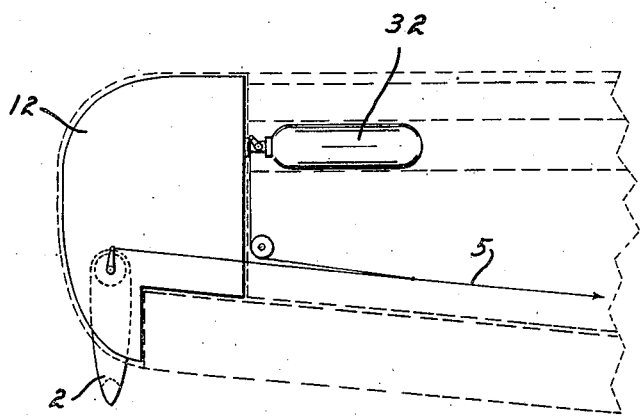
Figure 6 is a plan view of a modified type of installation.

The principles of this invention can be realized in other forms of execution. Thus in Figure 6, instead of providing a plurality of individual and individually mounted containers for the chemical, the entire wing tip may be formed as a chemical container, designated by the numeral 12, and this is removably secured in place upon the tip end of the wing proper, but by means (not shown) which will permit this tip as a whole to be dropped. In such a case the nozzle 2 may be mounted directly upon or beneath the removable wing tip 12. Its discharge is insured by a gas-filled container 32 of adequate capacity, which may be received in the interior of the wing. Such an arrangement affords an airplane which has no departure whatsoever from the proper aerodynamic contour except for the depending nozzle 2. If it is necessary to return to the base without having had an opportunity to discharge the chemical, the entire wing tip container 12 may be dropped when the plane has returned to a point near its base, but enough of the wing remains to enable the pilot to land with reasonable expectation of safety to himself and to the plane.

Figure 7:
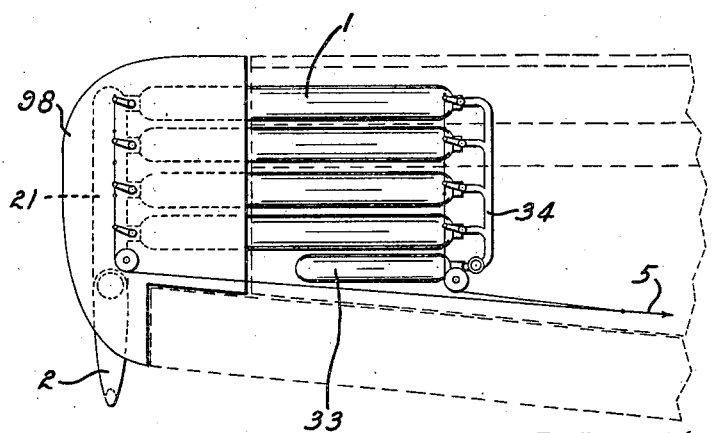
Figure 7 is a plan view of a further modified installation.

For greater capacity, and if it is desired to have larger individual containers, they may be mounted as shown in Figure 7, partly within the wing proper and partly within a removable tip 98. In this arrangement, instead of providing individual $CO_2$ bottles, a single bottle 33 is provided, connected by a manifold 34 to the individual chemical containers. By dropping the wing tip 98 the containers 1 may still be dropped or they may be received in recesses in the lower skin of the wing, and be permitted to drop from these recesses upon the occurrence of conditions making that necessary.

Figure 8:
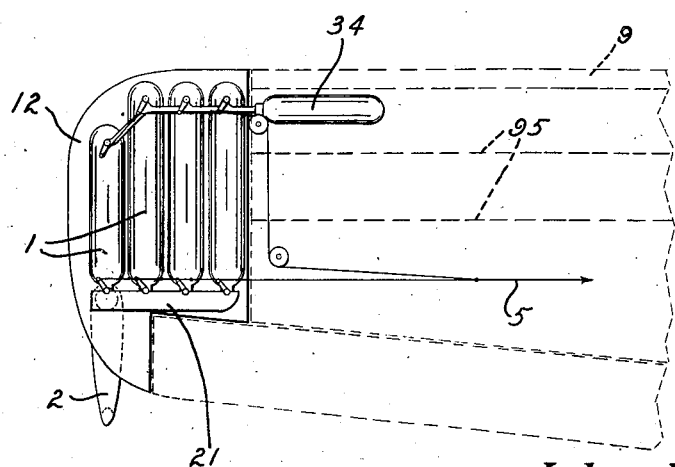
Figure 8 is a plan view of a still further modification.

In Figure 8 the chemical containers 1 are mounted all within a removable wing tip 12. Thus is combined the convenience of handling small individual units of form, shape, and size suitable for shipping, which may be individually connected to a header 21, and the convenience of dropping all such units with a wing tip within which they are contained, with the assurance that such a wing tip will, without question, drop when released, and thereby it is assured that the chemical containers will be detached from the plane in an emergency. A $CO_2$ bottle 34 is common to all the chemical containers 1 in this arrangement, although this is not necessarily the case.

What I claim as my invention is:

1. In combination with the wing of an airplane, and with a propeller mounted upon the airplane, a separable container for a chemical harmful to the airplane or to persons, said container being disposed in the wing tip, and substantially entirely within the aerodynamic contour thereof, a rearwardly-directed nozzle for the discharge of such chemical into the air stream, projecting well beyond the wing and disposed outside the slip stream from the propeller, means operable by the pilot to release such chemical from the container for discharge through said nozzle and emergency means operable to drop the container bodily from the aircraft structure.

2. In combination with the wing of an airplane, a chemical container disposed substantially wholly within the aerodynamic contour of the wing, a nozzle connected to the container for the discharge of such chemical, means operable by the pilot to release such chemical from the container for such discharge, said nozzle being mounted for movement at will from an inoperative position, retracted from the air stream, to a discharging position, projected into the air stream and spaced below the wing's lower surface.

3. In combination with an enclosed aircraft structure, a chemical container disposed substantially entirely within the same, a nozzle connected to the container for discharge of such chemical into the air stream, a container for a gas under pressure operatively connected to but normally sealed off from the chemical container, and disposed substantially entirely within the enclosed aircraft structure, pilot-operated means to release the chemical from the chemical container and to establish communication of the gas-filled container with the chemical container, for forcible discharge of the chemical, and an air scoop adapted to communicate with the chemical container, upon operation of the discharge means, to complete evacuation of the chemical container.

4. In combination with an aircraft structure having a recess within its aerodynamic contour, a cluster of similar but separate chemical containers received within said recess, a single nozzle connected to all of said containers and extending outside of such contour into the air stream, to a point so spaced from the aircraft structure that discharging chemical, caught by the air stream, will not deposit upon nor reenter the structure, and pilot-operated means to effect discharge of such chemical at will.

5. In combination with an aircraft structure having a recess within its aerodynamic contour, a separate chemical container received within said recess, a nozzle connected for discharge of chemical from said container, and mounted for movement at will from an operative position, wherein its discharge end is so disposed in the air stream and spaced from the aircraft structure that discharging chemical will not deposit upon nor reenter the structure, to an inoperative position wherein its drag is materially reduced, and pilot-operated means to effect discharge of such chemical through said nozzle.

6. In combination with an aircraft structure having a recess within its aerodynamic contour, a cluster of similar but separate chemical containers received within said recess, a single nozzle connected to all of said containers and extending into the air stream, pilot-operated means to effect discharge of such chemical from all of said containers through said nozzle, and emergency means to drop said containers from the aircraft structure.

7. In combination with an aircraft wing including spars and skin constituting a flotation element, a chordwise tunnel extending through said element, a separate chemical container received in said tunnel, a nozzle connected to the container and extending outside of the wing's aerodynamic contour for discharge of chemical into the air stream, and pilot-operated means to effect discharge of such chemical, through said nozzle.

8. In combination with an enclosed aircraft structure, a plurality of separate chemical containers disposed substantially wholly within the same, a nozzle operatively connected to each container, for discharge of chemical therefrom into the air stream, individual control means for each container operable to establish communication through such operative connection for flow of chemical from its interior to the nozzle, and pilot-operated means operable to actuate the several control means in continuous sequence for discharge of chemical from said containers to the nozzle successively, to effect thereby substantially continuous, sustained discharge through the nozzle.

9. In combination with an enclosed aircraft structure, a plurality of separate and separable chemical containers disposed substantially wholly within the same, a nozzle operatively connected to each container, for discharge of chemical therefrom into the air stream, individual control means for each container operable to establish communication through such operative connection for flow of chemical from its interior to the nozzle, pilot-operated means operable to actuate the several control means in continuous sequence for discharge of chemical from said containers to the nozzle successively, to effect thereby substantially continuous, sustained discharge through the nozzle, and pilot-operated means to drop all said containers in flight.

10. In combination with the wing of an airplane, a plurality of separate and separable chemical containers disposed substantially wholly within the wing's aerodynamic contour, a container similarly disposed and filled with a gas under pressure, and operatively connected to each chemical container, for forcibly discharging chemical therefrom, but normally sealed off from its chemical container, a nozzle operatively connected to the containers, and projecting into the air stream for discharge of the chemical, and pilot-operated means for substantially simultaneously establishing communication between each gas container and its chemical container and between the latter and the nozzle, and sequentially as to the several containers, to effect thereby sustained and substantially uniform discharge of chemical through the nozzle into the air stream.

11. In combination with an enclosed aircraft structure, a base supported therein, a nozzle leading therefrom to a point outside the enclosed aircraft structure, a sealed chemical container removably engageable with said base, for discharge therein, a sealed container filled with a fluid pressure medium removably connected to the chemical container, at a point distant from the base, both said containers being supported substantially wholly within the enclosed aircraft structure, and pilot-operable means to break the seal of each of said containers, to effect forcible discharge of chemical into the air stream through the nozzle by the expansion of the pressure medium.

12. In combination with an enclosed aircraft structure, a base supported therein, a nozzle leading therefrom to a point outside the enclosed aircraft structure, a sealed chemical container removably engageable with said base, for discharge therein, a sealed container filled with a fluid pressure medium removably connected to the chemical container, at a point distant from the base, both said containers being supported substantially wholly within the enclosed aircraft structure, pilot-operable means to break the seal of each of said containers, to effect forcible discharge of chemical into the air stream through the nozzle by the expansion of the pressure medium, and means to supply a continuing draft of air through the chemical container and nozzle, subsequent to such discharge of the chemical.

13. In combination with an enclosed aircraft structure, a header supported therein, a nozzle leading therefrom to a point outside the enclosed aircraft structure, a plurality of separate sealed chemical containers each individually removably engaged with said header, for discharge thereinto, a sealed container filled with a fluid pressure medium removably connected to each chemical container, at a point distant from the header, all said containers being supported substantially wholly within the enclosed aircraft structure, and pilot-operated means to break the seal of each of said containers, to effect forcible discharge of chemical into the air stream from the several chemical containers and through the nozzle, by the expansion of the pressure medium.

14. In combination with the wing of an airplane, a chemical container carried thereby and formed to constitute the wing tip, a nozzle connected to said container for discharge of the chemical into the air stream, means operable by the pilot to effect such discharge, and pilot-operated means to detach and drop the container in flight.

15. In combination with the wing of an airplane, a separable wing tip constituting an aerodynamically effective part of said wing, and droppable in flight, a separable chemical container supported in said wing tip, a nozzle leading therefrom for discharge of the chemical into the air stream past the wing tip, and pilot-operable means to release the chemical from said container for such discharge.

16. In combination with a military aircraft, a gas container carried thereby, a discharge nozzle leading therefrom, means to control discharge of the chemical from the container through the nozzle, means operable through a short period of time, and independently of the relative airflow, to effect positive evacuation of the chemical contents of the container, and further means operable sustainedly and after cessation of operation of the positive means, to insure complete evacuation of the container.

17. In combination with a military aircraft, a chemical container supported upon the aircraft, a discharge nozzle leading therefrom, a source of neutral gas under pressure, adapted for communication with the chemical container, means to establish communication at will between the pressure source and the container, for forcible and rapid evacuation of the contents of the container by the neutral gas, and an air scoop likewise adapted for communication with the gas container, opposite the discharge nozzle, the communication-establishing means being likewise arranged to establish communication of the air scoop with the gas container, upon discharge into the latter of the neutral gas.

18. In combination with an interrupted but otherwise streamlined aircraft structure, a chemical container shaped to fit and to complete the interrupted structure, and to constitute an integral smooth continuation thereof, a discharge nozzle the tip whereof, in discharging position, is spaced from the streamlined structure, in such position and so directed as to be educted by the relative airstream, means adapted for operation from within the aircraft structure to place the interior of the container in communication with the nozzle, for discharge, and means operable by the pilot to release and drop the container at will and while in flight.

19. In combination with the wing of an airplane, a cluster of replaceable chemical containers in the wing, a header interconnecting all said containers for discharge thereof through the header, a nozzle operatively connected to said header for dispensing chemical from such containers into the air stream, and means operable by the pilot to establish communication between the several containers and said header.

20. In combination with the wing of an airplane, a plurality of chemical cylinders arranged substantially in parallel side by side relationship within the contour of the wing, a header interconnecting all of said cylinders, a nozzle connected to said header for discharge of chemical from said cylinders into the air stream, and pilot-operated means movable to establish communication substantially simultaneously between all of said cylinders and said header, for discharge of the chemical from all such cylinders into the air stream through said nozzle.

21. In combination with an airplane wing, a plurality of elongated separate and similar chemical containers disposed in substantially side by side parallel disposition in the aircraft wing and extending generally chordwise thereof, each of said containers having a rearwardly directed discharge end, a header interconnecting all the discharge ends of said containers, a nozzle connected to said header for discharge of chemical therefrom into the air stream, and means operable by the pilot to establish communication between each of said containers and said header.

22. The combination of claim 21, each container having a compressed gas bottle connected thereto, and further pilot-operated means to establish communication between each compressed gas bottle and its corresponding chemical container.

23. The combination of claim 21 in which the airplane wing is provided with a plurality of tunnels extending chordwise of the wing, each tunnel receiving a chemical container, and further means operable by the pilot for ejection of containers emptied of chemical from their corresponding tunnels for discharge from the airplane in flight.

24. In combination with an airplane wing, a plurality of separate, similar, elongated chemical containers disposed substantially in parallel side by side arrangement in the wing, a discharge header interconnecting all the adjacent ends of said containers, a nozzle connected to said header for discharge of chemical therefrom into the air stream, a source of fluid under pressure, a second header connected to such source of pressure fluid and connected to all the opposite adjacent ends of said containers, pilot-operated means movable to establish communication between said containers and said discharge header, and further pilot-operated means operable to establish communication between said second header and the opposite ends of said containers, for admission of pressure fluid to such containers to expel the chemical therefrom into said discharge header for discharge through said nozzle.

25. In combination with an aircraft structure, a plurality of separate chemical containers carried thereby, a nozzle operatively connected to such containers, for discharge of chemical therefrom into the air stream, individual control means for each container operable to establish communication between such container and the nozzle, and pilot-operated means arranged and organized to actuate the several individual control means in closely-spaced sequence for discharge of chemical from said containers to the nozzle successively, to effect thereby substantially continuous, sustained discharge through the nozzle.

26. In combination with an aircraft structure, a sealed chemical container carried by said aircraft structure, a nozzle connected to said container for discharge of chemical therefrom, a pressure source, means connecting said source for discharge within said container, and means operable at will to break the seal of said container, thus to establish communication between the pressure source, the container, and the nozzle, in turn, for positive discharge of the chemical under the influence of the pressure source.

JOHN F. HABERLIN.